United States Patent
Johnson

(10) Patent No.: US 9,565,803 B2
(45) Date of Patent: Feb. 14, 2017

(54) MACHINE PART WITH LASER CLADDING AND METHOD

(71) Applicant: Keith A. Johnson, Kewaskum, WI (US)

(72) Inventor: Keith A. Johnson, Kewaskum, WI (US)

(73) Assignee: Kondex Corporation, Lomira, WI (US)

( * ) Notice: Subject to any disclaimer, the term of this patent is extended or adjusted under 35 U.S.C. 154(b) by 141 days.

(21) Appl. No.: 14/177,356

(22) Filed: Feb. 11, 2014

(65) Prior Publication Data

US 2015/0017394 A1   Jan. 15, 2015

Related U.S. Application Data

(63) Continuation-in-part of application No. 13/938,410, filed on Jul. 10, 2013, now Pat. No. 9,044,820.

(51) Int. Cl.
| | |
|---|---|
| *B32B 3/10* | (2006.01) |
| *A01F 12/46* | (2006.01) |
| *B65G 33/26* | (2006.01) |
| *A01D 41/12* | (2006.01) |

(52) U.S. Cl.
CPC ........... *A01F 12/46* (2013.01); *A01D 41/1217* (2013.01); *B23K 26/342* (2015.10); *B65G 33/265* (2013.01); *B23K 2201/20* (2013.01); *Y10T 428/24777* (2015.01)

(58) Field of Classification Search
CPC ............................................. Y10T 428/24777
See application file for complete search history.

(56) References Cited

U.S. PATENT DOCUMENTS

| | | | |
|---|---|---|---|
| 3,937,317 | A | 2/1976 | Fleury, Jr. |
| 4,666,033 | A | 5/1987 | Reid |
| 4,842,126 | A | 6/1989 | McConnell |
| 6,089,334 | A | 7/2000 | Watts |
| 6,533,105 | B1 | 3/2003 | Dutschke |
| 2002/0131328 | A1 | 9/2002 | Bowens et al. |
| 2002/0136083 | A1* | 9/2002 | Haberer ............. B29C 47/0844 366/79 |
| 2009/0095214 | A1 | 4/2009 | Whitfield |
| 2011/0155027 | A1 | 6/2011 | Waldner |
| 2012/0063871 | A1 | 3/2012 | Wood |

FOREIGN PATENT DOCUMENTS

EP    2200914 A2    6/2010

\* cited by examiner

*Primary Examiner* — Christopher Polley
(74) *Attorney, Agent, or Firm* — Reinhart Boerner Van Deuren P.C.

(57) ABSTRACT

A machine part for agricultural, turf, mining or construction equipment for processing material is provided. The machine part comprises a base material. A clad material is deposited on the base material to form at least one blunt edge along the body. The clad material comprises a second hardness greater than the first hardness.

25 Claims, 13 Drawing Sheets

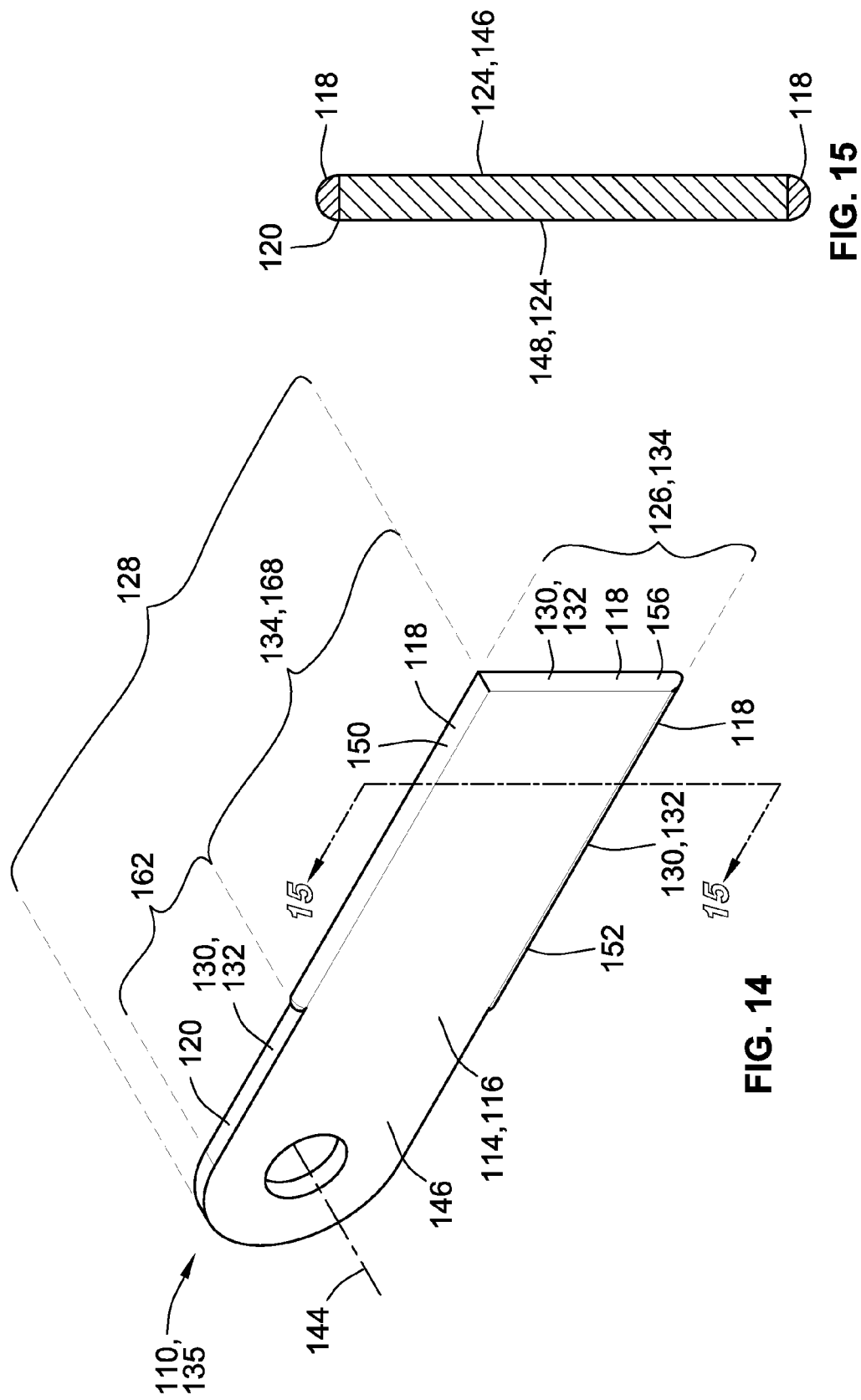

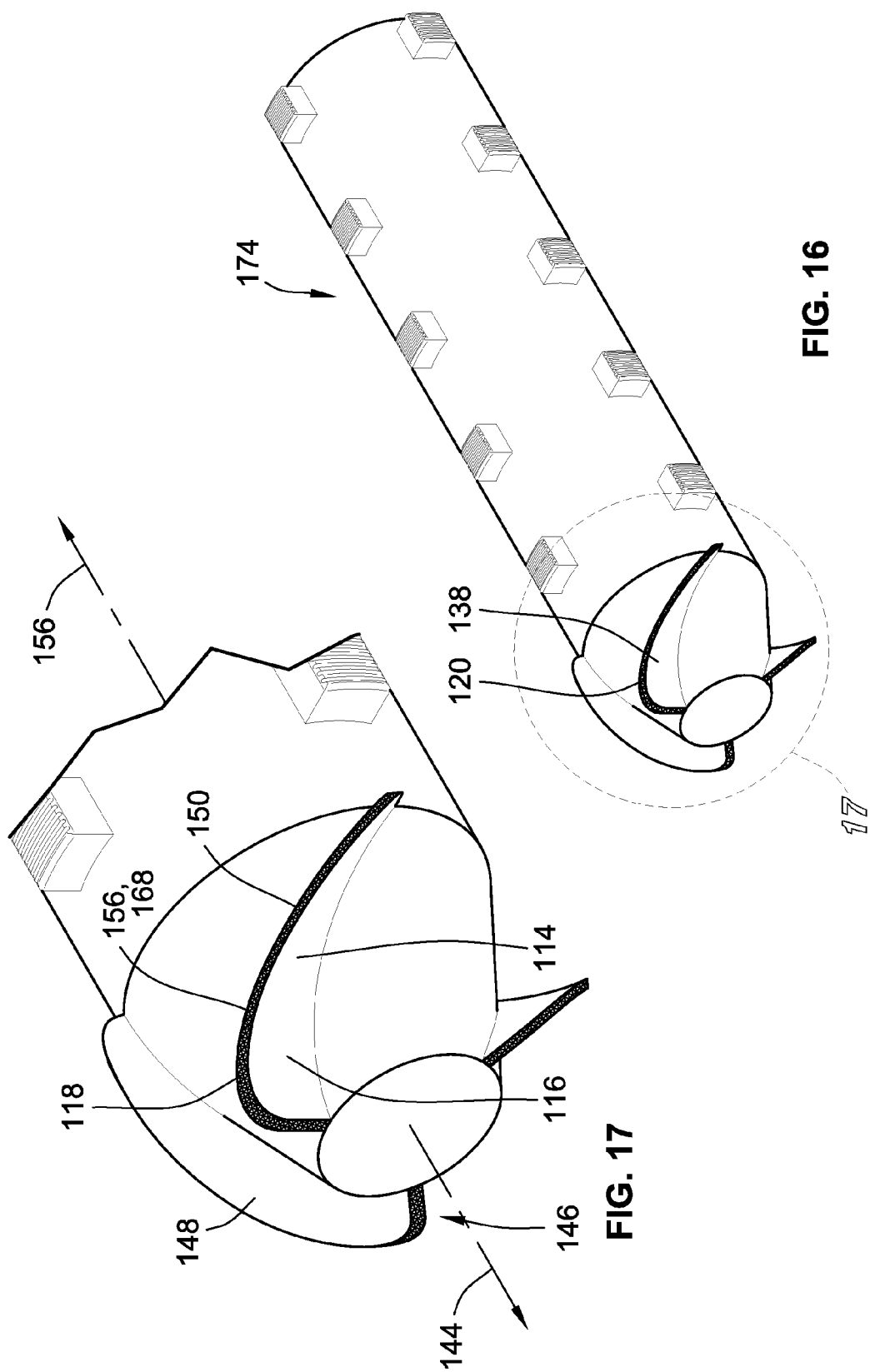

MACHINE PART WITH LASER CLADDING AND METHOD

CROSS-REFERENCE TO RELATED PATENT APPLICATIONS

This patent application is a continuation-in-part of co-pending U.S. patent application Ser. No. 13/938,410, filed Jul. 10, 2013, the entire teachings and disclosure of which are incorporated herein by reference thereto.

FIELD OF THE INVENTION

This invention generally relates to machine parts that have blunt edges impacted by a flow of abrasive material.

BACKGROUND OF THE INVENTION

Augers are well known in the art and have been employed in many industries over the years. Augers have proven particularly useful in the field of agriculture. For example augers are employed in combines, transport tube augers, and grain bins to name just a few of the many agricultural uses for augers. Examples of such agricultural augers are shown for example in U.S. Pat. No. 4,842,126 and European Patent No. 2200914.

Frequently augers are used to move fungible materials like grain from one location to another. Often times the material being moved by the augers is hard and abrasive. The hard material, for example, dried corn, is abrasive and erodes the flight of the auger. Over time, the erosion of the auger flight diminishes the flight's and thereby the auger's performance and efficiency. Such wear may cause the auger or even the equipment employing the auger to be replaced. Further, in some instances such worn auger flights can damage the very material that it intended to move.

The auger's loss of performance can be attributable to at least two types of erosion. The first type of auger erosion is found on the top edge of the flighting. In an auger application such as a transport auger such erosion creates an undesirable gap between the auger flight and the tube in which the auger turns. The increased gap allows the conveyed material to slip past the auger flight, not be moved up the tube and thereby result in decreased efficiency. The reduced efficiency of the auger system can eventually lead to the system becoming inoperable.

A second example of erosion is attributable to that which occurs along the face of the flighting. This type of erosion typically takes place along the outer periphery of the flight face and can eventually lead to large segments of flighting becoming detached from the auger.

Efforts have been made to address such auger flight erosion. For example various hard face coatings including thermal spray, plating and various heat treatments through induction or hardening have been applied to the flighting. Further efforts to address the wear problem have included the use of ultrahigh molecular weight flighting as shown in U.S. Pat. No. 4,666,033 or adding additional material to the flight face near the outer edge of the flighting. Additional material to a conveyor is shown in U.S. Pat. No. 3,937,317.

In Agricultural applications traditional weld face techniques have also been applied to augers. However, such efforts introduce a great amount of heat into the auger flight. Because the cross section of the flighting is thin, the high heat applied in this manner can distort the flighting material and further disadvantageously impart undesired metallurgical properties. Such efforts to address auger flight erosion have proven costly, labor intensive and have not reduced to the desired degree of reduced erosion and increased efficiency.

BRIEF SUMMARY OF THE INVENTION

The present invention is directed toward increasing the life span of such augers. The present invention achieves this by providing one of or both of laser cladding to the edge of the auger flighting and laser heat treating to the outer periphery surface of the auger flighting. These and other advantages of the invention, as well as additional inventive features, will be apparent from the description of the invention provided herein.

In one aspect, a fabricated agricultural auger for conveying grain material is provided. An embodiment of the auger according to this aspect includes a shaft that is adapted to rotate about a central axis. A flight extends and spirals about the shaft. The flight further includes a base material of a first hardness. The flight is separately fabricated from the shaft and is welded or otherwise secured thereto. A laser treated material is formed on or into the base material along a portion of the flight. The laser treated material comprises a second hardness greater than the first hardness.

The laser treated material may comprise laser hardening and/or laser cladding.

The base material can be steel and the laser treated material may comprise a laser hardened layer formed integrally with an outer surface of the base material. The laser hardened layer may be at least 0.5 millimeter in depth thickness along the base material.

An embodiment may provide for the laser hardened layer to be between 0.5 and 5 millimeters in depth thickness along the base material. A cross section thickness of the flight is reduced at treated regions of the laser hardened layer relative to untreated regions of the base material.

An embodiment can have a fabricated agricultural auger that has a predetermined inlet end and a predetermined outlet end. The flight includes an upstream face that faces toward the outlet end and a downstream face that faces toward the inlet end. The rotation of the auger conveys material from the inlet end to the outlet end. The laser hardened layer is along the upstream face only and the downstream face only has an outer untreated surface of the base material.

The embodiment may further include an outer treated region of the laser hardened layer along an outer radial periphery of the flight. The inner untreated region of an outer surface of the base material may be disposed radially between the outer treated region and the shaft.

The outer treated region can be between 5% and 35% of a radial span of the flight. The base material can have a hardness of less than 25 in Rockwell C Scale hardness. The laser treated material may have a hardness between 30 and 65 in Rockwell C Scale hardness.

The laser treated material may comprise laser cladding that includes clad material different than the base material. The clad material can be laid along an outermost circumference of the flight that forms a radial outermost peripheral contact surface.

An embodiment of the fabricated agricultural auger may have a predetermined inlet end and a predetermined outlet end. The flight can include an upstream face that faces toward the outlet end and a downstream face that faces toward the inlet end. Rotation of the auger conveys material from the inlet end to the outlet end. An outer circumference edge of base material may extend between the upstream face and the downstream face and laser clad is formed along the outer circumference edge.

Another embodiment of the fabricated agricultural auger may have a predetermined inlet end and a predetermined outlet end. The flight can include an upstream face that faces toward the outlet end and a downstream face that faces toward the inlet end. Rotation of the auger conveys material from the inlet end to the outlet end. An outer circumference edge of base material extends between the upstream face and the downstream face. The laser clad is formed along the outer circumference edge and the flight faces are free of laser clad.

The clad material may include at least one of the materials comprising: tungsten carbide, chrome carbide, iron carbide, ceramic, and other material having a Vickers scale hardness between HV 450-3200.

The laser treated material may comprise laser cladding that includes a clad material different than the base material. The base material can be steel and the laser treated material can additionally comprise a laser hardened layer formed integrally with an outer surface of the base material. The clad material may be joined with the laser hardened layer at an outer radial edge thereof.

Another aspect of the present invention is directed toward a method of hardening a fabricated agricultural auger. The auger includes a shaft adapted to rotate about a central axis. A flight is adapted to extend around and spiral about the shaft. The flight includes a base material of a first hardness. The flight is separately fabricated from the shaft and welded or otherwise secured thereto. The method includes laser treating a portion of the base material to provide a hardened region to the auger with a second hardness greater than the first hardness.

The laser treating can include laser cladding a clad material to a region proximate an outermost circumferential surface of the flight. The laser treating can include laser hardening an outer surface of the base material to provide a laser hardened layer formed integrally with the base material. The laser treating may be conducted after the flight is secured to the shaft.

The laser treating may include laser cladding a clad material to a region proximate an outermost circumferential surface of the flight. It can include laser hardening an outer surface of the base material to provide a laser hardened layer formed integrally with the base material.

Yet other aspects of the present invention include incorporation of the fabricated agricultural auger in various agricultural grain handling devices such as transport tube augers, tube augers, combine harvesters or agricultural grain bins that utilize trough augers, horizontal and overhead tube augers as well as free/tubeless augers to name just a few grain handling devices employing the fabricated agricultural grain auger.

In yet another embodiment the present invention provides for an agricultural grain handling device that comprises an agricultural housing that comprises at least one of a grain bin, an auger tube and an auger trough. An auger is disposed in the housing. The auger comprises a shaft adapted to rotate about a central axis. A flight extends and spirals about the shaft. The flight comprises a base material of a first hardness. A laser treated material is formed on or into the base material along a portion of the flight. The laser treated material comprising a second hardness greater than the first hardness.

The base material may be steel, and the laser treated material comprises a laser hardened layer formed integrally with an outer surface of the base material.

The auger has a predetermined inlet end and a predetermined outlet end, the flight includes an upstream face that faces toward the outlet end and a downstream face that faces toward the inlet end. The rotation of the auger conveys grain (e.g. corn, rice, beans or the like) from the inlet end to the outlet end. The laser hardened layer is along the upstream face only and only the downstream face has an outer untreated surface of the base material.

The auger may comprise an outer treated region of the laser hardened layer along an outer radial periphery of the flight, and an inner untreated region of an outer untreated surface of the base material disposed radially between the outer treated region and the shaft. The laser treated material may comprise laser cladding including a clad material different than the base material. The clad material can be laid along an outermost circumference of the flight so that it forms a radial outermost peripheral contact surface.

The auger may have a predetermined inlet end and a predetermined outlet end. The flight can include an upstream face that faces toward the outlet end and a downstream face that faces toward the inlet end. The rotation of the auger conveys material from the inlet end to the outlet end. An outer circumference edge of base material may extend between the upstream face and the downstream face. The laser clad is formed along the outer circumference edge.

In another aspect the auger may have a predetermined inlet end and a predetermined outlet end. The flight can include an upstream face facing toward the outlet end and a downstream face facing toward the inlet end. The rotation of the auger conveys material from the inlet end to the outlet end. An outer circumference edge of base material extends between the upstream face and the downstream face. The laser clad is formed along the outer circumference edge. The flight faces are free of laser clad.

The clad material can comprise at least one of the materials comprising: tungsten carbide, chrome carbide, iron carbide, ceramic, and other material having a Vickers scale hardness between HV 450-3200.

The laser treated material may comprise laser cladding that includes a clad material different than the base material. The base material may be steel. The laser treated material may additionally comprise a laser hardened layer formed integrally with an outer surface of the base material. The clad material may be joined with the laser hardened layer at an outer radial edge thereof.

Still another aspect of the present invention provides for a machine part for agricultural, turf, mining or construction equipment for processing material. The machine part comprises a body that includes a base material and a clad material. The clad material is deposited on the base material and forms at least one blunt edge along the body. The clad material comprises a second hardness that is greater than the first hardness.

The machine part includes a material thickness defined between two sides. The two sides define width and length spans that are each at least 5 times or more than the material thickness. A material thickness edge forms a periphery of the body and extends transversely between the two sides. The clad material is deposited on the material thickness edge. The clad material is deposited only upon the material thickness edge and not along either of the two sides. A region of the material thickness edge is covered by the clad material. The region extends perpendicular or within 15 degrees of perpendicular between the two sides. In one embodiment the body may be comprised of a sheet steel formed component part having a substantially uniform material thickness. The clad material may be at least one of the materials comprising: tungsten carbide, chrome carbide, iron carbide, ceramic, and other material having a Vickers scale hardness between HV 450-3200.

In other embodiments the body forms at least one of a chopper, fan blade, auger flight, grain elevator component, or a rotating agricultural part configured for engaging at least one of grain or stalk material.

In still other embodiments the body may have a predetermined axis of rotation. The body has opposed first and second sides with a blunt edge extending transversely between the first and second sides. The body during rotation has a leading face and a trailing face following the leading face. The sides extending rearwardly from the leading face to the trailing face. The clad material and the blunt edge may form at least part of the leading face. A radially outward face may be defined extending between the first and second sides. The radially outward face faces away from the predetermined axis of rotation. The clad material and the blunt edge may form at least part of radially outward face. The clad material and the blunt edge may form at least part of the leading face and the trailing face. A radially outward face is defined extending between the first and second sides. The radially outward face faces away from the predetermined axis of rotation. The clad material and the blunt edge may form at least part of radially outward face.

The clad material may comprise at least one laser clad bead or beads deposited upon the material thickness edge having a depth of between 0.5 and 10 millimeters, and wherein a width of the at least one laser clad bead or beads extends between 25 and 120 percent of the material thickness. The clad material may entirely cover a cladded region of the material thickness edge. The cladded region may extend a full width between the two sides. The clad material may partially overlap the sides at an intersection of the sides with the material thickness edge. The material thickness edge may further comprise an uncladded region free of the clad material. The clad material comprises less than 15% by weight of the part and greater than 95% of a surface area of the body may be exposed and not covered by the clad material.

In yet another embodiment a stalk or grain harvester may include the machine part. The machine part is arranged to engage crop material being run through the grain harvester.

In the forgoing embodiments the machine part may have an impact zone at a leading edge. The impact zone when in use contacts a flow of material prior to other remaining portions of the machine part. The clad material covers the impact zone and not the remaining portions of the machine part.

Yet another aspect of the invention provides a method of cladding at least one blunt edge of a machine part comprising a base material of a first hardness. The method includes cladding material onto a surface of the machine part to provide a hardened region with a second hardness greater than the first hardness and configuring a blunt face along the clad surface to engage with a flow of agricultural material. The machine part may comprise a material thickness defined between two sides. The two sides define width and length spans that each are at least five (5) times or more than the material thickness. A material thickness edge forms a periphery of the body and extends transversely between the two sides. The method further includes depositing the clad material in a direction normal to or primarily facing the material thickness edge.

The depositing of the clad material is directed toward the material thickness edge and not directed along either of the two sides. The cladding comprises laser cladding particles upon the surface. The method may further include covering a region of the material thickness edge by the clad material. The region extends perpendicular or within 15 degrees of perpendicular between the two sides. The method may include configuring the body into at least one of a chopper, fan blade, auger flight, grain elevator component, or a rotating agricultural part configured for engaging at least one of grain or stalk material.

The method may further comprise configuring the body with a predetermined axis of rotation. The body may have opposed first and second sides with the blunt edge extending transversely between the first and second sides. The body during rotation may have a leading face and a trailing face following the leading face. The sides may extend rearwardly from the leading face to the trailing face. The clad material and the blunt edge may form at least part of the leading face.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 14 is an isometric view of an embodiment of the present invention; a cladded chopper blade.

FIG. 15 is a side view of the chopper blade of FIG. 14.

FIG. 16 is an isometric view of an embodiment of the present invention; a combine rotor assembly.

FIG. 17 is an enlarged view of the cladded edge of the auger flight of FIG. 16.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
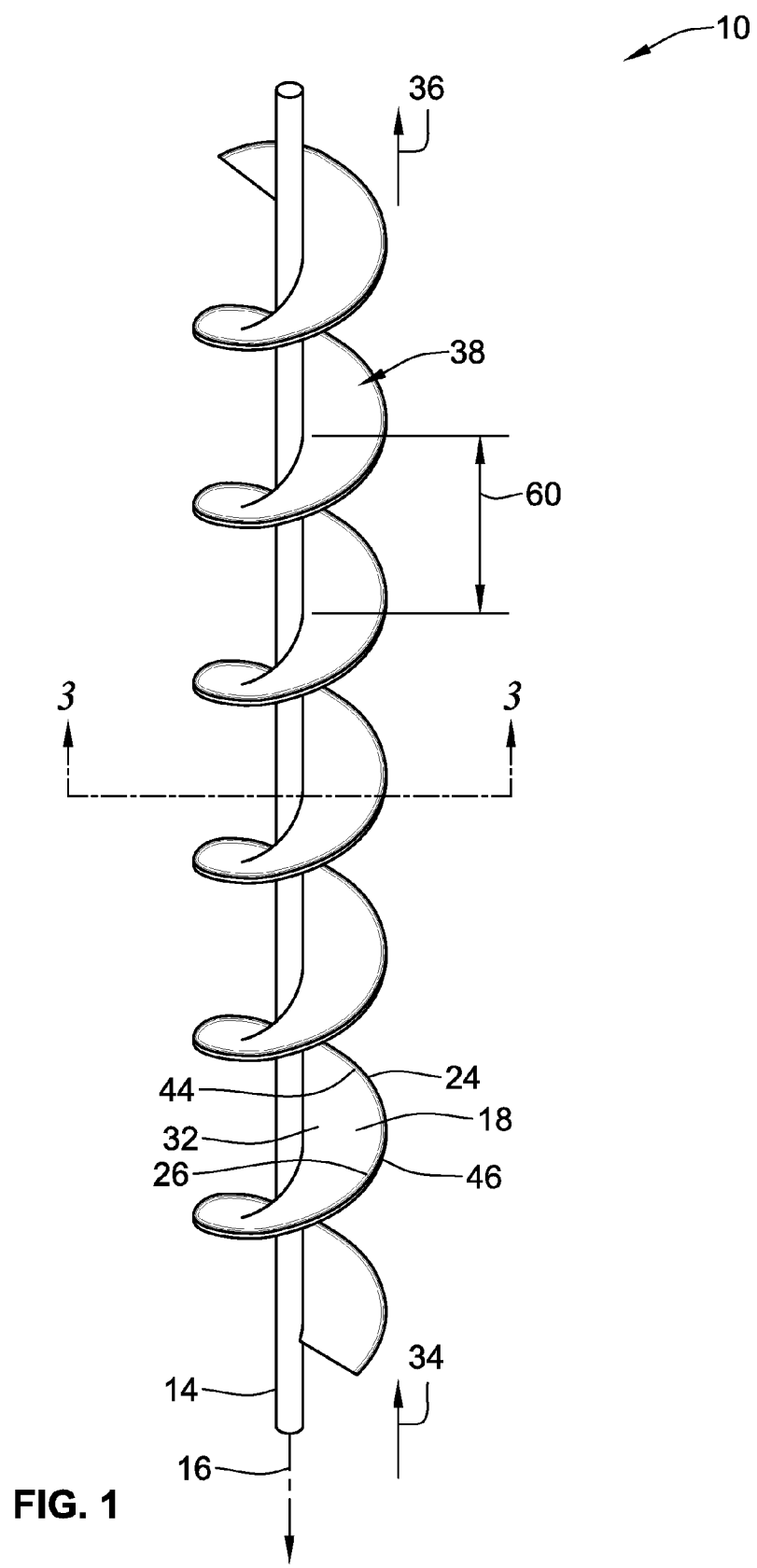
FIG. 1 is an isometric view of a fabricated agricultural auger of an embodiment of the present invention.
Figure 2:
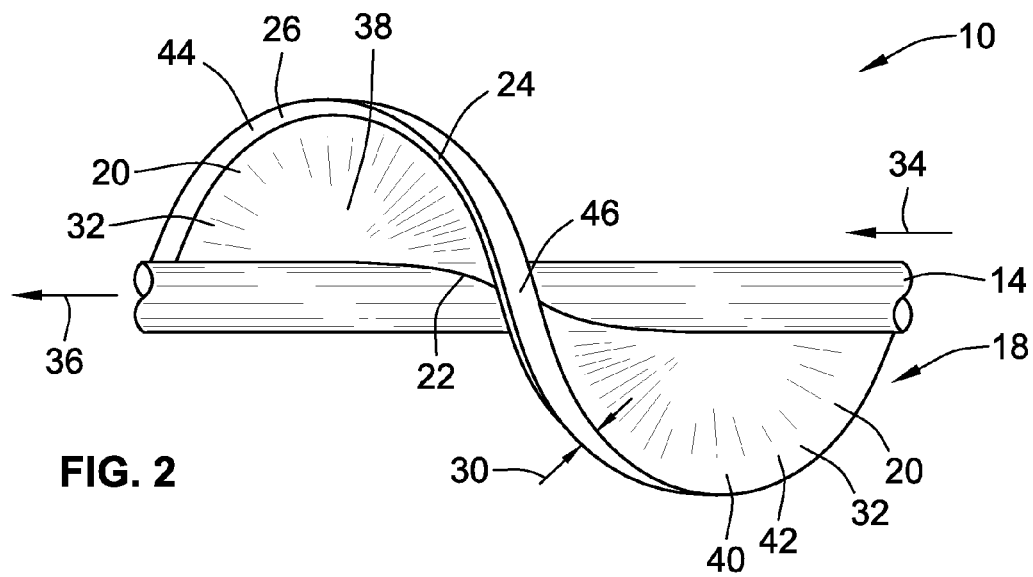
FIG. 2 is an enlarged isometric view of an area of auger flighting showing the laser hardened portion and the laser clad portion.
Figure 3:
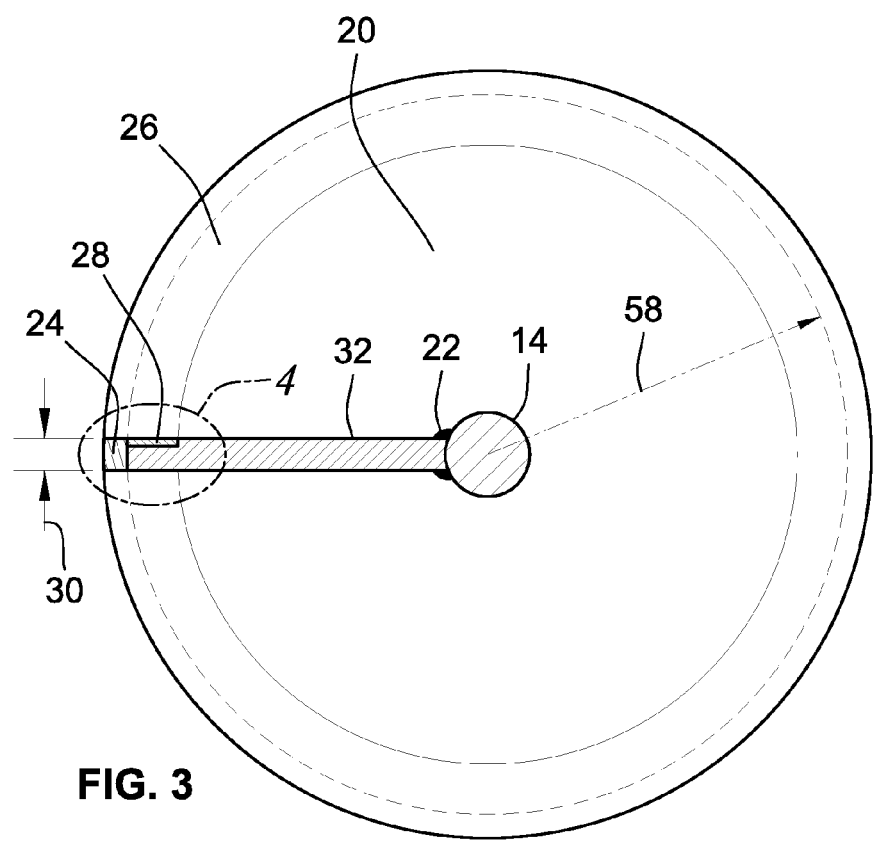
FIG. 3 is a cross section of the auger flighting of FIG. 1.

As shown in FIGS. 1-3, an agricultural auger 10 according to an embodiment of the present invention is illustrated. The agricultural auger comprises a shaft 14 adapted to rotate about a central axis 16. A flight 18 extends spiraling about the shaft 14. The flight 18 comprises a base material 20 of a first hardness. The base material 20 may be steel but can be comprised of any of the materials commonly used in the manufacture of augers. In an embodiment of the present invention that provides for a fabricated agricultural auger, the flight 18 is separately fabricated such as from sheet steel and thereby separated from the shaft 14 that is rod or bar stock. The flight can be spirally configured and welded 22 or otherwise secured to the shaft 14. In a welded embodiment as shown in FIG. 2 welds or other fastening means 22 are placed at that part of the flight in contact with the shaft. The welds 22 are further shown in an exaggerated fashion in FIG. 3. It can be readily appreciated that where the agricultural auger is not fabricated such welds 22 would not be present. The flight pitch 60 may be between 0.25 and 4 per foot. The flight outer diameter may be between 3" and 4" for most agricultural applications.

The agricultural auger has an inlet end 34 and an outlet end 36. Although illustrated is a preferred embodiment that moves grain from the inlet end 34 to the outlet end 36. It is readily apparent that there are many agricultural uses for an agricultural auger 10 such as grain bins, tube augers or combine harvesters to name just a few examples. The material being moved, for example grain, travels along an upstream face 38 of the flight towards the outlet end 36 of the agricultural auger 10. The grain traveling along the upstream face of the flight 38 can cause wear to the base material 20 of the flighting 18 along the outer radial periphery 44 of the flight 18 and to the outer circumferential edge 46 of the flight 18.

The present invention seeks to prevent wear and erosion to the outer radial periphery 44 of the upstream face 38 by applying laser hardening. An outermost circumference comprises a circumferential edge 46 of the flight 18 by application of laser cladding.

In the preferred embodiment of the present invention the outer radial periphery 44 of the base material 20 of the flight 18 is laser treated to harden the outer radial periphery 44 of the flight 18. This laser hardened area comprises a material of second hardness 26 on the upstream face 38 of the flight 18.

FIG. 2 shows an enlarged view of the untreated downstream face 40 and the upstream face 38 where laser hardening has been applied to the outer radial periphery 44 of the flight 18 leaving a treated laser hardened upstream layer 28 and an untreated region of flight base material 32. The outer treated region may comprise between 5% and 35% of a radial span 58 of the flight 18 while 100% of the downstream face 40 of the flight makes up a region free of any laser hardening or laser cladding whatsoever.

When laser hardening is applied on the upstream face 38, a region free of any laser hardening or cladding of between 65% and 95% of the upstream face 38 of the flight 18 may exists. Though, as discussed more fully below, certain embodiments may have no laser hardening whatsoever on either the upstream 38 or downstream face 40 of the flight 18.

Restricting the laser hardening application to the outer radial periphery of the upstream face of the flight 38 and laser cladding the outer circumferential edge 46 of the base material 20 has a fabrication cost benefit of placing laser hardening and/or laser cladding only where erosion occurs. There are yet further fabrication benefits. For example, traditional welding techniques induce a great deal of heat into the auger flight. Because auger flight materials tend to be relatively thin in cross section, this high heat input can cause distortion of the material and impart undesirable metallurgical conditions in the base material 20 including softening of the flight material which will lead to accelerated wear. Laser cladding and laser hardening are performed with a very shallow heat affected zone. This low heat input process reduces the issues of shape distortion in the flighting where laser hardening and/or cladding are not applied and thus its application does not negatively affect the metallurgical structure of the base material 20.

Figure 4:
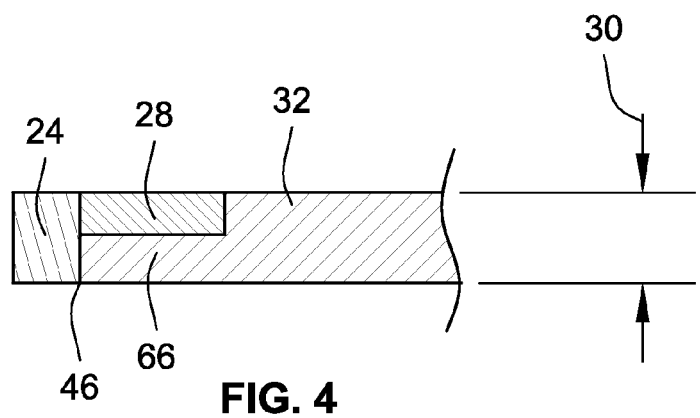
FIG. 4 is an enlarged cross sectional area of the flighting taken about area A of FIG. 3 with the hardened region thickness being exaggerated for illustrative purposes.

Additionally, FIG. 2 shows in this preferred embodiment that laser cladding 24 has been applied to the outer circumferential edge of the flight 18. Thus, FIG. 2 shows both laser hardening 26 and laser cladding 24 applied to the flight 18. However, it can be readily appreciated that depending on a number of variables such as but not limited to the base material 20, the desired wear rate and labor costs it may be that the flight receives only laser cladding on its outer circumferential edge 46 as shown in FIG. 4B. Further, it may be that only that portion of the circumferential edge 46 that abuts the outer radial periphery 44 of the upstream face 38 of the flight 18 and not the entire width of the circumferential edge 46 receives the cladding.

Figure 4A:
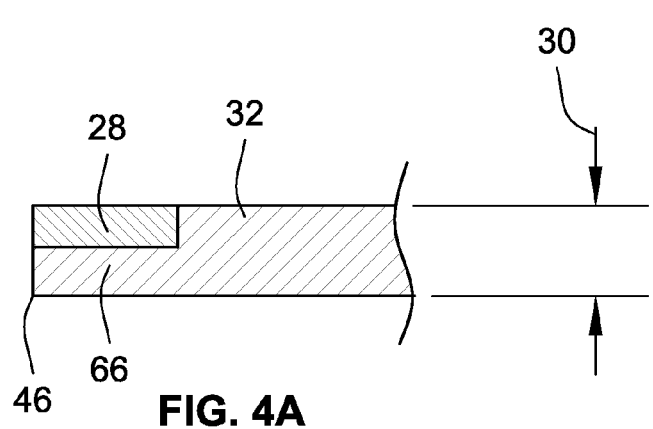
FIG. 4A is an enlarged cross sectional area of flighting of an embodiment where only laser hardening has been applied to the outer radial periphery of the upstream flight face with the hardened region being exaggerated for illustrative purposes. In this embodiment no laser cladding has been applied to the outer circumferential edge.
Figure 4B:
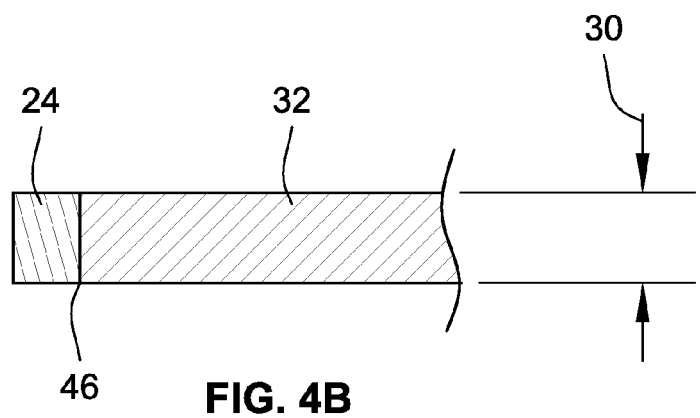
FIG. 4B is an enlarged cross sectional area of flighting of an embodiment where only laser cladding has been applied to the outer circumferential edge. In this embodiment no laser hardening has been applied to the flight.
Figure 4C:
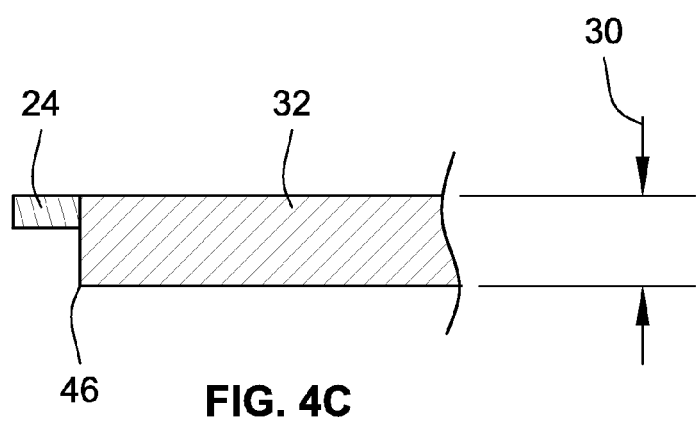
FIG. 4C illustrates an embodiment wherein laser cladding has been applied to only a portion of the width of the outer circumferential edge nearest the outer radial periphery of the upstream flight face.

Still further, it may be that an embodiment has a flight 18 with only laser hardening into its outer radial periphery 44 on its upstream face 38 but does not receive laser cladding on its outer circumferential edge 46 as shown in FIG. 4A. Though not shown here, laser hardening might be applied into the outer circumferential edge 46 of the flight 18. In still other embodiments, not shown here, the laser cladding may be applied to the outer circumferential edge 46 such that it overlaps the edge and resides on the outer radial periphery 44 of the flight 18. The overlap portion may extend from the outer circumferential edge 46 for 1 cm but preferably 1 mm onto the outer radial periphery 44 of the flight 18.

FIG. 3 illustrates an enlarged cross section of the flighting of the preferred embodiment of the agricultural auger 10.

The shaft 14 is shown. For most or many agricultural applications the shaft may have a diameter between 0.5 inches and 3 inches and a length between 2 feet and 10 feet with welds 22 that attach the spiraled flighting 18 to the shaft. In long transport augers such as in grain bin applications the overall length can be much greater with multiple shafts splined or connected together. It can be readily appreciated that other known fastening means besides welding may be used. Further, while fabricated augers are common in agricultural applications and thereby an inventive aspect, an embodiment of the present invention includes an agricultural auger that is not fabricated but rather one that maybe be casted, forged or machined. The cross section thickness 30 of the flighting 18 may be between 0.03 inches and 0.75 inches.

FIG. 3 further illustrates the laser hardened region 26 on the outer radial periphery of the flight 18. Where laser heat treating in the form of laser hardening is employed energy is transmitted to the outer radial periphery 44 of the upstream face 38 of the flight 18 in order to create a hardened layer by metallurgical transformation 26, 28. The laser is used as a heat source, and rapidly raises the surface temperature of the material. Heat sinking of the surrounding area provides rapid self-quenching, thus producing a material microstructure that results in a hardened transformation layer 26, 28. This treated hardened layer can extend between 0.5 and 5 millimeters in depth thickness. The laser hardening extends to some degree to an area beyond this expressed depth thickness due to heat transfer to the base material 20 as a result of the laser hardening process.

FIG. 4 shows a cross section of the flight 18 about the radial periphery 44 where laser hardening has been applied and where cladding has been applied to the outer circumferential edge 46. The decreased cross sectional thickness CT of the flight 18, due to the reduction in thickness of the laser hardened region 28 treated region, relative to the cross section 30 of the untreated region 32 of the flight 18 is shown. The base material 20 may have a hardness less than 25 in Rockwell C Scale hardness while laser hardened area 28 is between 0.5 and 5 millimeters in depth thickness. The laser hardened area can have a higher relative hardness between 30 and 55 in Rockwell C Scale hardness.

FIGS. 3 and 4 illustrate the clad layer 24 on the outer circumferential edge 46 of the flight 18. The cladding may be between 0.5 mm and 5 mm in thickness. When cladding is employed, preferably, it comprises tungsten carbide but may also comprise alternatively titanium carbide, chrome carbide, iron carbide, ceramic, and/or high hardness particles in the range of 1200-2500 on the Vickers scale hardness. A finishing process may or may not be employed to the cladding 24 after it is applied to the outer circumferential edge 46 of the flight 18. For example, grinding or other such smoothing operation can be done.

Figure 5:
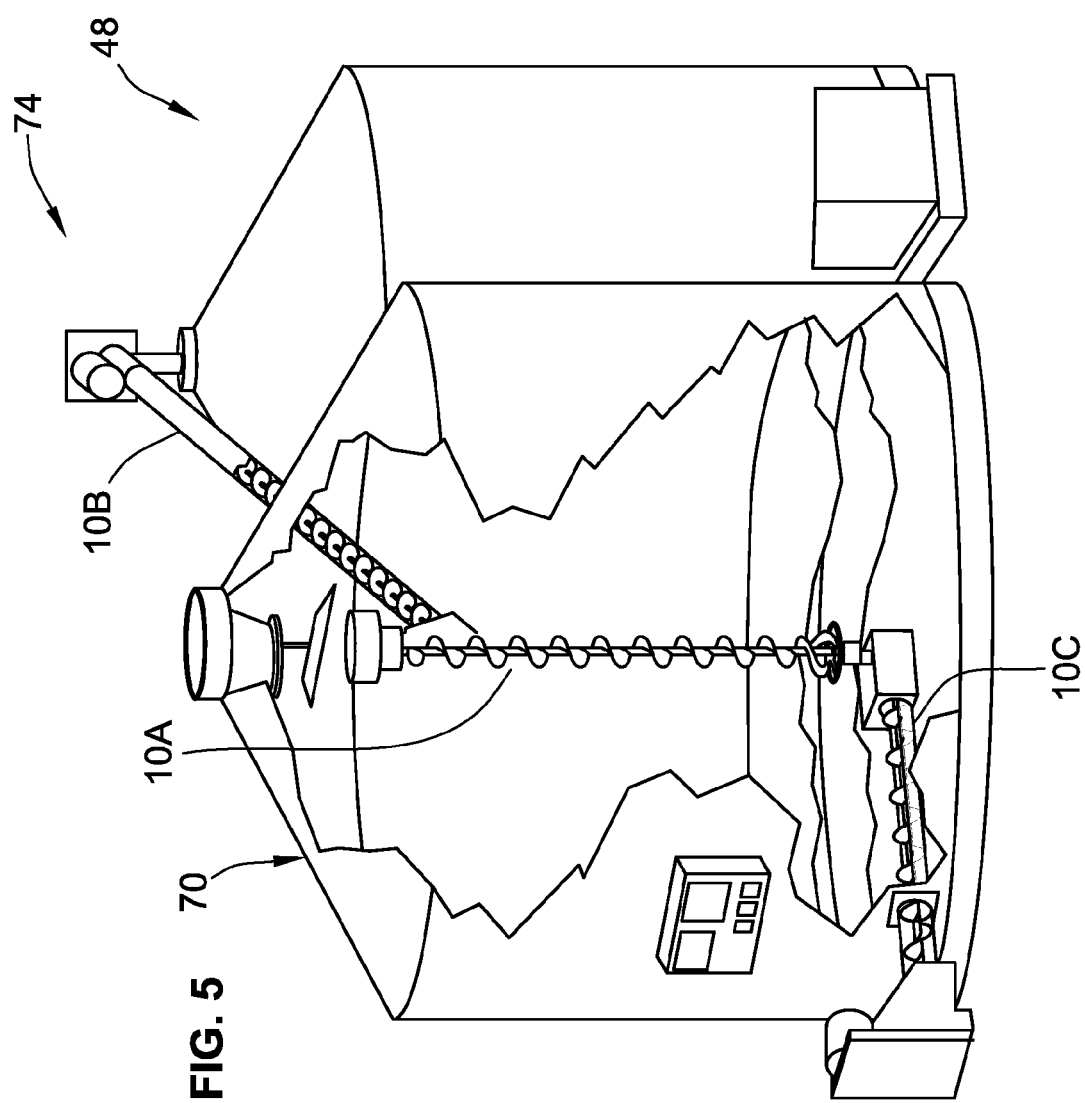
FIG. 5 is a schematic of an agricultural bin employing an embodiment of the present invention.

FIG. 5 illustrates an agricultural grain handling device 74 comprising an agricultural housing 70 comprising an agricultural bin 48 which includes agricultural augers according to embodiments of the present invention in vertical tubeless auger 10A, an overhead tube auger 10B and a trough auger 10C. It is readily apparent that the agricultural augers of the agricultural grain handling devices illustrated in FIGS. 5-8 may be either or both a fabricated agricultural auger or an agricultural auger which has not been fabricated but rather one that has been forged, casted or machined. Such an auger is illustrated in FIGS. 2-3 for example but without the welds or other fastening means 22. Thus, FIG. 1 can be understood to be either a fabricated agricultural auger or an agricultural auger.

Figure 6:
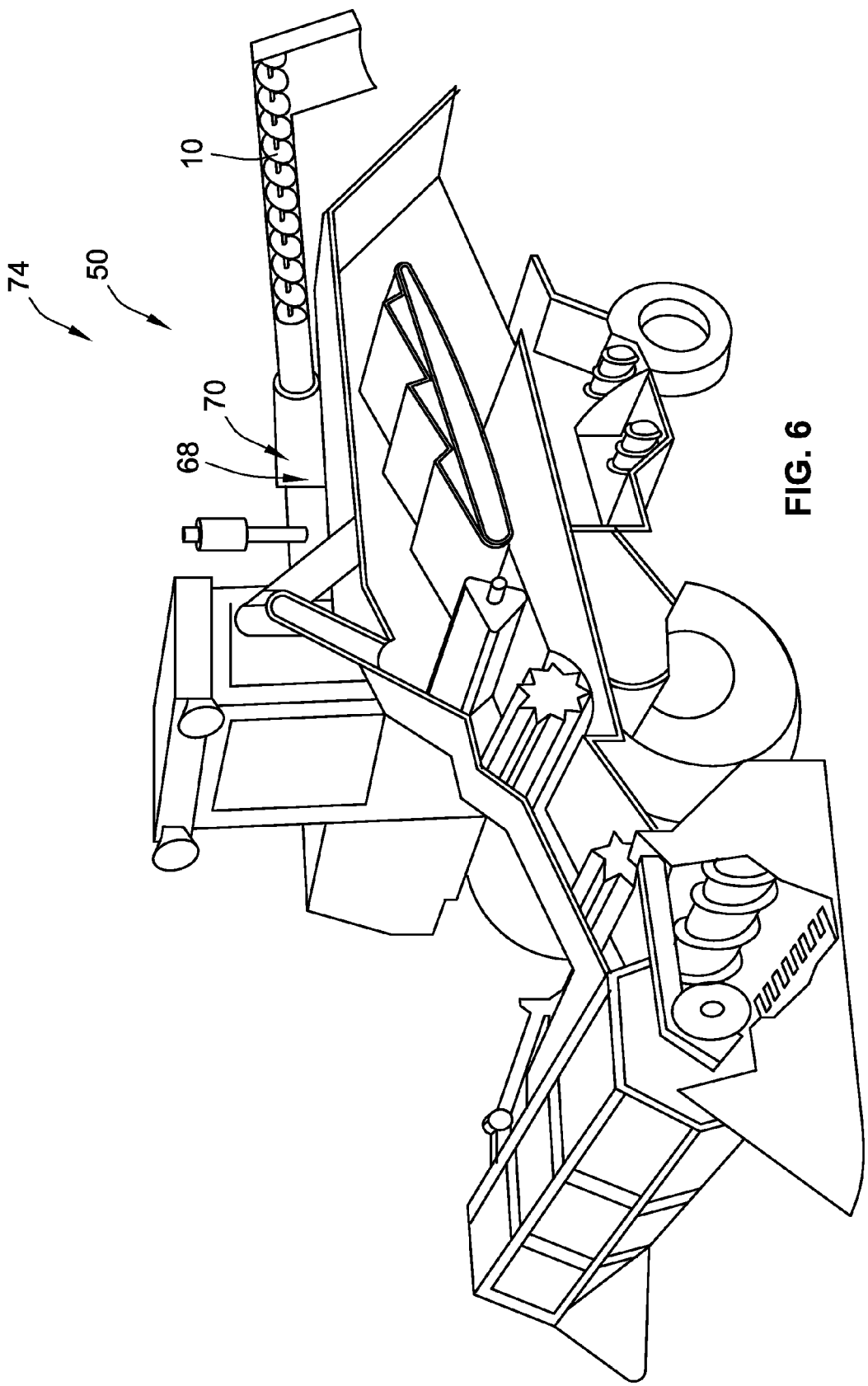
FIG. 6 is a schematic of a combine harvester employing an embodiment of the present invention.
Figure 7:
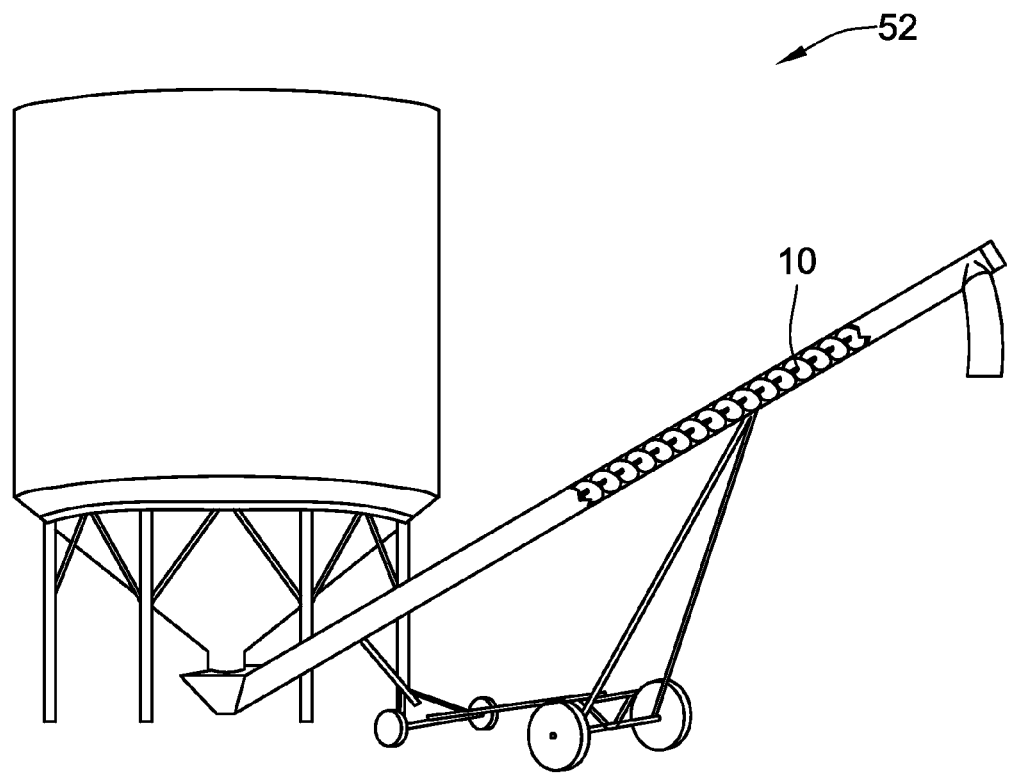
FIG. 7 is a schematic of tube auger employing an embodiment of the present invention.
Figure 8:
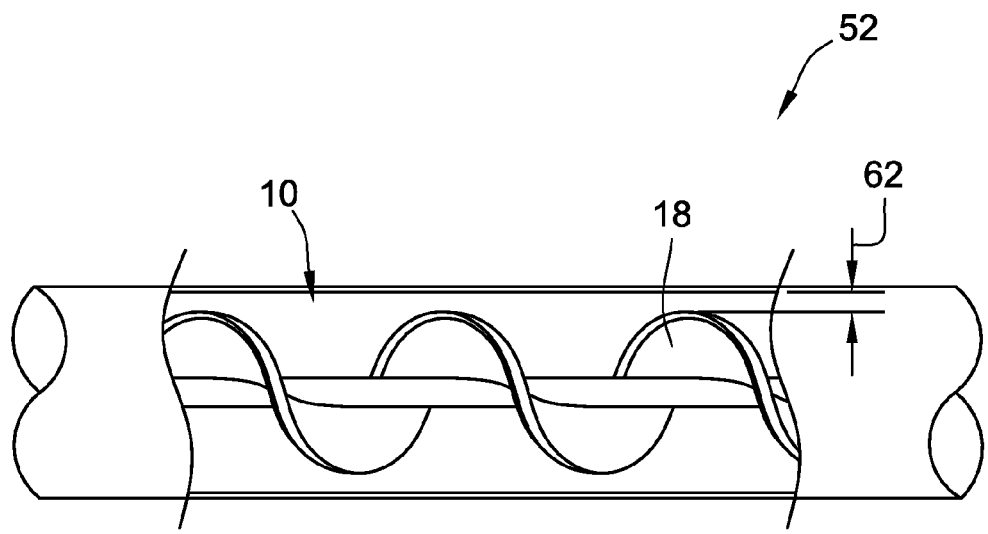
FIG. 8 is a schematic of a cross section of the tube auger of FIG. 7 of the present invention with clearance between auger and tube being exaggerated for illustrative purposes.

FIG. 6 illustrates an agricultural grain handling device comprising an agricultural housing 70 comprising a combine harvester 50 employing a section of the agricultural auger 10 which includes a bin 68 which further includes an agricultural auger according to an embodiment of the present invention. FIG. 7 illustrates an agricultural grain handling device comprising an agricultural housing comprising a tube auger 52 with an embodiment of the present invention. FIG. 8 shows a cross section schematic of the agricultural auger 10 within the tube auger 52 of FIG. 7. A clearance 62 between the tube 52 and the outer circumferential edge 46 of the flight 18 with cladding 24 is shown. The clearance 62 may be between 0 mm and 20 mm, but typically greater than 1 mm.

The use of laser hardening and laser cladding provides for a very precise heat treatment pattern, a small transition zone between the hardened area and the unhardened areas, minimal distortion in the fighting and the ability to heat treat the auger 10 as assembled. Further, one or the other of the of the laser heat treatment methods may be employed as desired, that is laser cladding might be employed on one section of auger or to the entire auger while yet another auger may have only laser cladding applied and no laser hardening while still another auger might have both laser cladding and laser hardening applied.

Where laser cladding is applied control of the laser cladding tool can be made to vary the profile of the laser cladding material in both depth and width, that is laser cladding may be applied so as to increase the radial span 58 of the flight 18 and/or the laser cladding may be applied in various widths to span the entire outer circumferential edge 46 of the flight 18, or over only a portion of the circumferential edge 46 or even over the circumferential edge 46 onto the upstream face of the flight 38. Application then of the laser cladding tool may include increasing processing speeds to make thinner sections and decreasing processing speeds to make thicker sections. For example, the laser cladding tool can be run faster or slower, which correspondently deposits more or less material. Alternatively, laser power can be varied through a pass to change the deposition rates. Alternatively, or in addition, the powder flow rate through a laser tool pass can be made to radially decrease or increase the depth of cladding over the outer circumferential edge 46.

Figure 9:
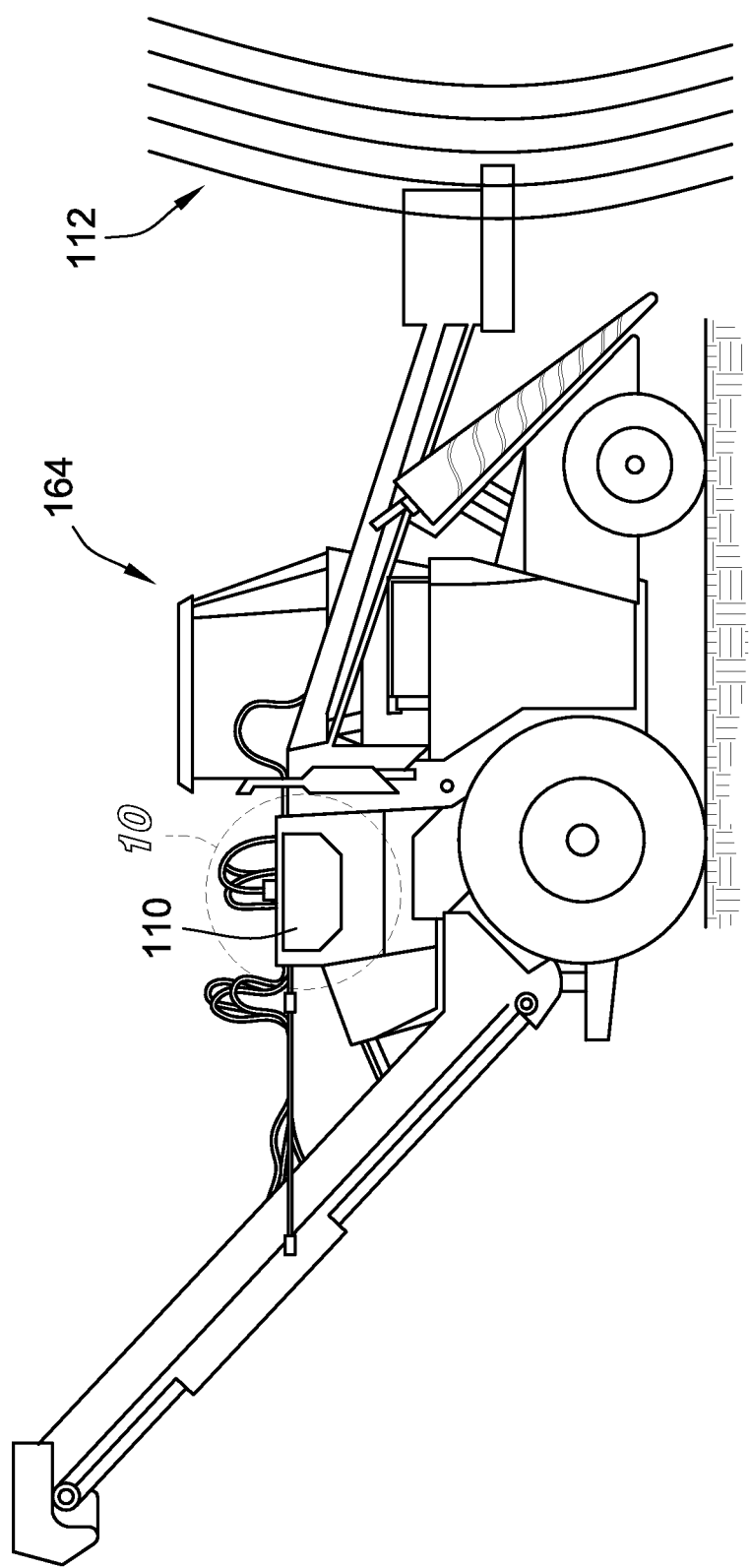
FIG. 9 is a schematic of a cane harvester that includes a cladded machine part of the present invention processing material.

Turning now to FIG. 9 and another embodiment of the present invention is presented. Illustrated is a stalk harvester 164 moving through material 112. As the harvester 164 cuts the material it is processed internally in a material flow within the harvester 164. One of the machine parts 110 processing the material flow is a fan blade 136.

Figure 10:
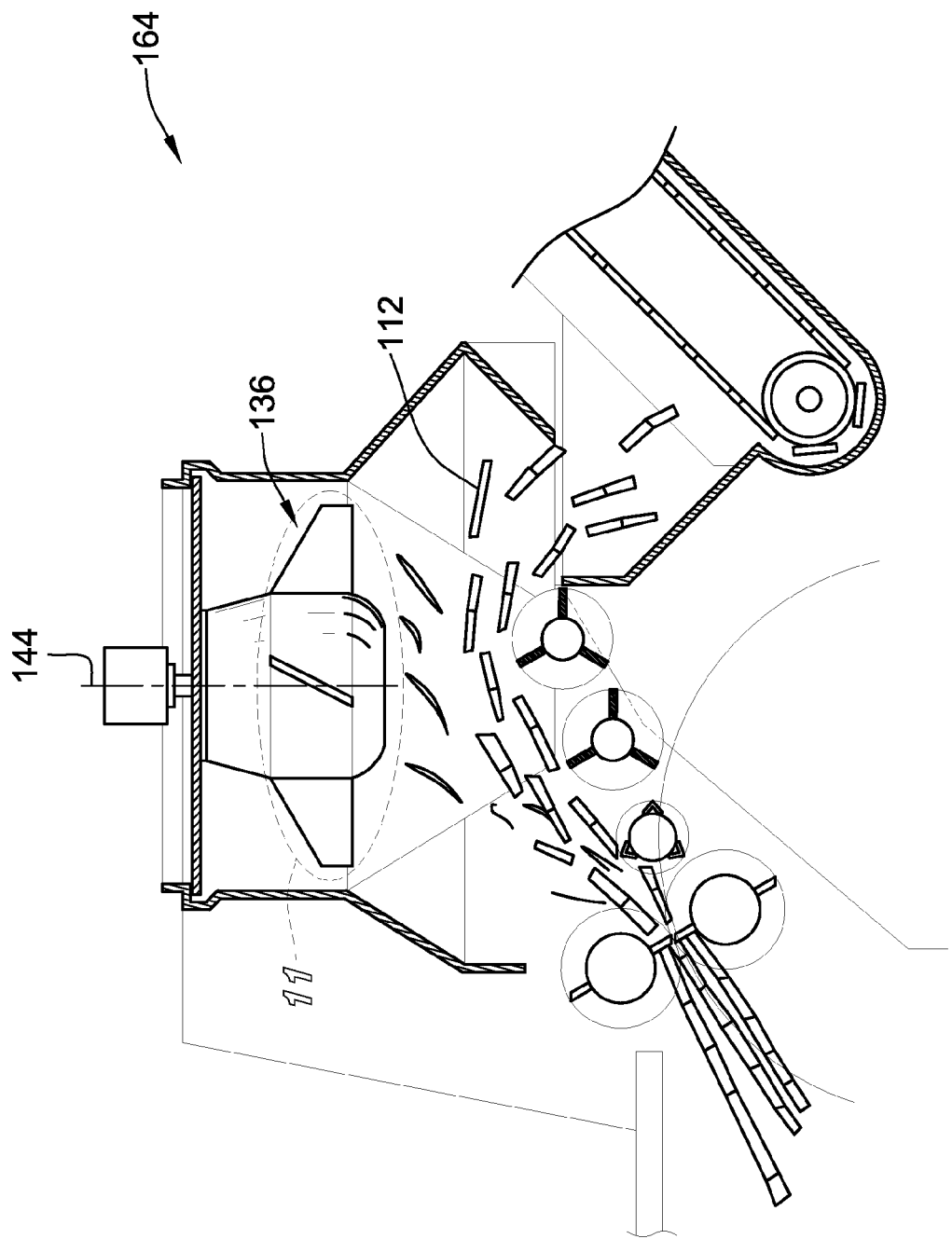
FIG. 10 is a cutaway schematic of the cane harvester of FIG. 9 illustrating the cladded machine part, in this embodiment a fan, within the cane harvester.

FIG. 10 illustrates in greater detail the fan blade 136 as the flow of material 112 is processed out of the harvester 164. It is readily apparent to those skilled in the art that this flow of crop material 112 about the blunt edges 120 of the fan 136 causes wear at edges of the metal parts that are impacted by the material flow. Because of the inefficiency produced from wear and deterioration that the impact of the flow of material causes to the fan blade, the actual rotation of the fan blade 136 becomes unbalanced. Thus, with the wear to the edges of the rotating metal part 110 and with the unbalanced rotation, additional expense is incurred in harvesting the material because of the demand for additional power from the machine 164 to process the flow of material 112.

The flow of material 112 impacting the leading blunt edge of the machine part 110 results in process inefficiencies and in certain cases, structural damage to the equipment exposed to these material flows. These conditions exist with machine parts 110 that are stationary having the material flow past the machine part 110 as well as parts 110 that are in motion with material being processed. Previous solutions to offset these wear issues included hard facing the material faces in which the process material flows across. However, the solutions did not protect the blunt leading edge of the machine part 110. An alternate or additional solution was to heat treat the machine part 110 which did improve the life of the machine part 110 but did not provide the wear life required in modern high performance equipment.

With certain embodiments a new and improved solution is offered in the form of laser cladding high wear material to the edge of thin section materials (between 1 and 13 millimeters in thickness). Prior attempts to protect these components were limited to protecting the component face from treating the entire microstructure of the material. However, these prior processes are not sufficient to protect the leading edge of the components in today's high performance equipment.

An innovative solution is the use of the laser cladding process to address the wear of thin section edges by protecting the component where the wear process initiates. In certain applications to be described more fully herein, the edge of a component is exposed to the flow of processed material over or into the thin section of the component. Suitable solutions were not available for these situations. Some of the advantages that laser cladding these end machine part edges are that a fully fused coating ensures that the high wear material remains connected to the part in harsh material flow environments. The unique metallurgical bonding of laser clad coatings ensures that the coating and the substrate are truly one part.

Traditional flame spray, HVOF, and plasma coatings are only mechanically bonded to the surface and are unsuitable for protecting the edge of a part exposed to material flow impacting the edge. Further, greater coating thicknesses allow for an adequate amount of high wear material to be deposited to ensure the proper life of the product. The traditional hard facing methodologies are limited in their thickness in order to avoid delamination of the coating. Additionally, the minimal amount of heat input into the base parts is especially critical for end section parts, for example a leading blunt edge 120 of fan blade 136. (FIG. 13) End section parts, that is, leading edges of machine parts impacted by material flow, have a very limited amount of heat tolerance before the part will distort or the edge to be protected, starts to melt. The lower heat input allows for thin section machine parts 110 that are already formed or heat treated to be coated and ultimately protected in material flows 112. Also, the high precision of the laser cladding process allows for the laser cladding to be tracked precisely along complicated geometry often associated with thin section machine parts 110 used in material flow applications. The advantage of certain embodiments is to address the wear at its initiation site, that is precisely applying hard materials at the impact zone in order to stop the wear before it can start and reduces the amount of hard facing material required which in the end reduces cost.

Figure 11:
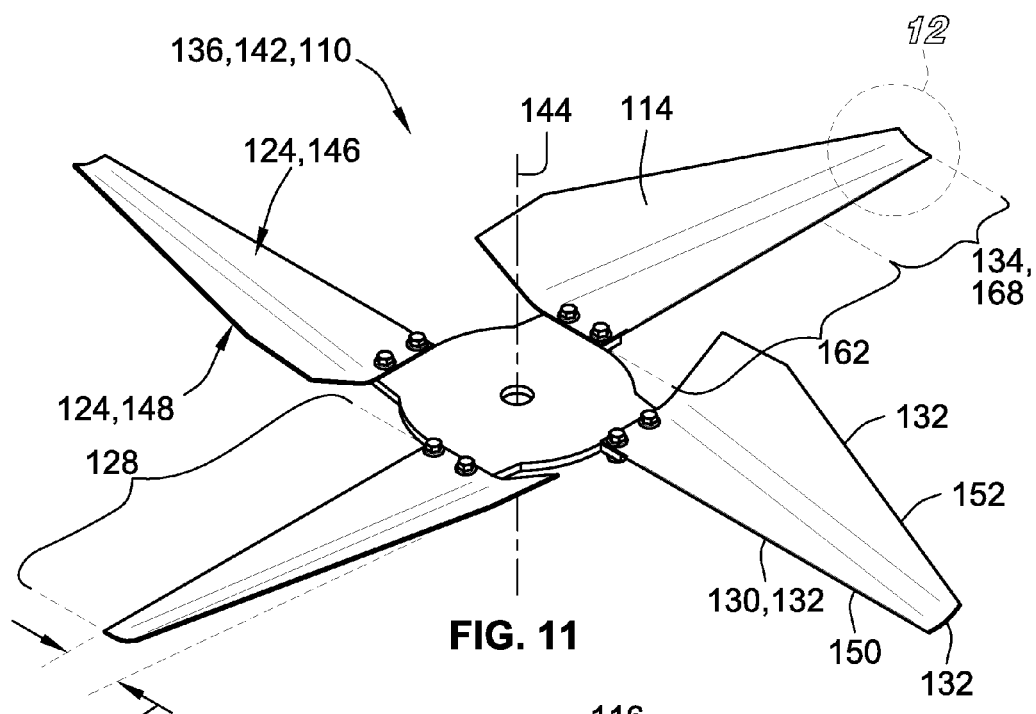
FIG. 11 is an isometric view of the machine part of FIG. 10.
Figure 12:
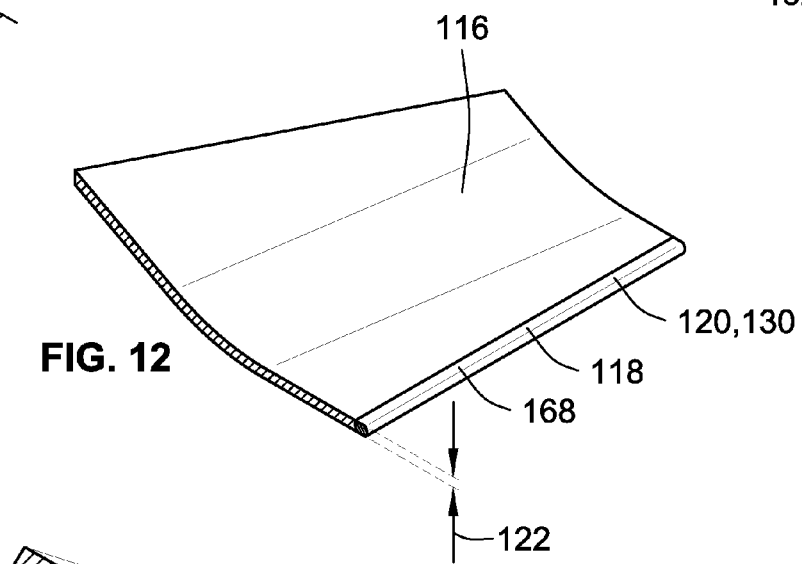
FIG. 12 is a schematic view of cladded blunt edge of the machine part of FIG. 11.
Figure 13:
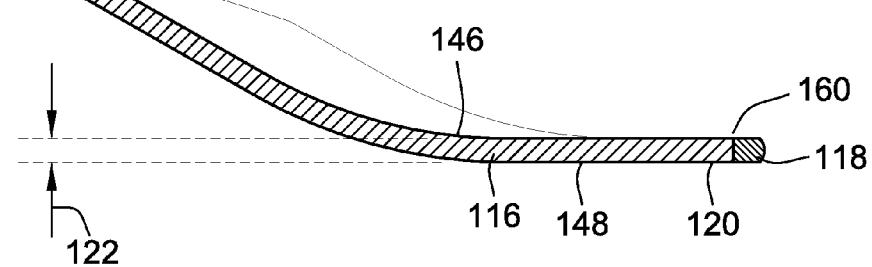
FIG. 13 is a side view of the cladded edge of the machine part of FIG. 11.

Attention is now turned to FIGS. 11-13. The machine part 110 is comprised of a body 114 that forms a rotating part 142 that is fan blade 136 within stalk harvester 164. The fan 136 has an axis of rotation 144. The fan blade 136 has a body 114 comprised of a base material 116 of a first hardness. The fan 136 has two sides 124, that is, a first opposed side 146 and a second opposed side 148. A material thickness 122 is defined between the two sides 124. The sides 146, 148 define width 126 and length 128 spans that are each at least five (5) times or more than the material thickness 122. A material thickness edge 130 forms a periphery 132 of the body 114 and extends transversely between the two sides 124. A clad material 118 (See FIG. 13) of a second harness is deposited on the material thickness edge 130. Accordingly, one skilled in the art recognizes that clad material 118 may be applied to ether a sharp edge or to a blunt edge like the blunt edge 120 as herein depicted. Preferably, as there is no reason to sharpen, the clad material is applied to a leading blunt edge and becomes a leading blunt edge.

Still with respect to FIGS. 11-13, with the application of the laser clad material 118 the material thickness edge 130 of the fan blade 136 remains blunt. Blunt can be understood then as an edge that is not sharp in fact the material edge between the two sides 124 may be a flat surface or even round or irregular. Preferably, a bead of laser cladding as applied with little or no finishing that is without sharpening and thereafter, grinding may be performed in the event of imperfections or overflow onto sides in some cases. For example, it may be that more finishing is appropriate in embodiments like that shown in the fan blade 136 wherein the aerodynamics of the leading face 150 for the balance of the fan blade 136 is more desired than for example the chopper 135 or grain elevator component 140 embodiments. In those embodiments and others it may even be advantageous to have the laser clad material overlap the leading face or material thickness edge onto the edges as shown for example in FIG. 20. An advantage of the present invention is the precise depositing of laser clad material 118 onto a machine part that is impacted by a flow of material and not just an application to produce a sharp edge, for example an edge that cuts the material. Illustrated here is laser clad material 118 deposited only upon a leading face 150 of a material thickness edge 130 and not along the face of either of the two sides 146, 148. Only a region 134 of the material thickness edge 130 of the leading face of each blade shown in fan blade 136 is covered by the laser clad material 118.

The region 134 extends perpendicular or within 15 degrees of perpendicular between the two sides 146, 148. Here the body 114 comprises a sheet steel formed component having a substantially uniform material thickness 122. However, it can be readily understood the machine part 110 may be on of formed, casted, or composite to name just a few of the material selections possible in the laser cladded machine part 110 of the present invention. Further, the clad material 118 that is deposited by the laser comprises at least one of the materials comprising tungsten carbide, chrome carbide, iron carbide, ceramic, and other material having a Vickers scale hardness between HV 250-3200. To be clear, in this embodiment, the fan blade 136 during rotation has a leading face 150 and a trailing face 152 that follows the leading face 150. Sides 146 and 148 are in opposed relationship to one another and extend rearwardly 154 from the leading face 150 to the trailing face 152. Accordingly, in the embodiment illustrated here the body 114 forms a fan blade 136 which is one of a rotating agricultural part 140. Described in this way with respect to rotation the clad material 118 on the blunt edge 120 forms at least part of the leading face 150.

The clad material 118 comprises at least one laser clad bead 160 or beads deposited on a blunt edge 120 of a material thickness edge 130 and may have a depth of between 0.5 and 10 millimeters. The width of the at least one laser clad bead 160 or beads extends between 25 and 120 percent of the material thickness 120, more preferably between 90% and 110%. As such the laser clad material 118 may partially overlap the sides 146, 148 at an intersection of the sides 146, 148 with the material thickness edge 130, for example as shown in FIG. 20. The clad material 118 may comprise less than 15 percent by weight of the part. However, in certain embodiments clad material may comprise less than 10 percent by weight of the part. In yet other embodiments the clad material 118 may comprise less than 5 percent by weight of the part. It is noted that these numerical range parameters in this and the following paragraph can apply to all the different embodiments and other figures heretofore discussed and those discussed below that is FIGS. 1-20.

Greater than 95 percent of a surface area of the body 114 is exposed, that is not covered by the clad material 118. The advantage of cladding on the machine part 110 illustrated in FIGS. 11-13 as fan 136 is that an impact zone 168 at the leading edge 150 is covered in clad material 118 where the fan's material thickness edge 130 contacts the flow of material 112 prior to impacting other remaining portions of the machine part 110. However, not all of the leading edge 150 necessitates coverage with clad material 118. In certain embodiments a region free of cladding 162 may be present. Thus, in various embodiments of the invention only the impact zone 168, that is, where the material flow 112 impacts the blunt edge and causes the most wear may be clad. The cost saving advantage of limited application is readily appreciated. The clad material 118 can be precisely applied to the impact zone 168 and not the remaining portions of the machine part 110 that is the cladding 118 is not applied to remaining portions of the body 114 such as the uncladded leading edge 162 or remaining peripheral edges 132 or the uncladded surface of sides 146 and 148.

Turning then to FIGS. 14 and 15, illustrated is yet another embodiment of the present invention and that again as previously mentioned, may include parameters mentioned for prior embodiments. Here, a machine part 110 has a body 114 that forms a chopper 135. Choppers 135 are frequently used in agriculture, for example, in processing straw. The body of chopper 135 is comprised of a base material 116 of a first hardness. Clad material 118 is shown deposited on the base material 116 forming at least one blunt edge 120 along the body 114. The clad material 118 is of a second hardness greater than the first hardness. The machine part 110 includes a material thickness 122 defined between two sides 124. The two sides 124 define a width 126 span and a length 128 span that are each at least five times or more than the material thickness 122. A material thickness edge 130 forms a periphery 132 of the body 114 and extends transversely between the two sides 124. The clad material 118 is deposited on the material thickness edge 130. Shown here the clad material 118 is deposited only upon the material thickness edge 130 and not along either of the two sides 146, 148, other than potential overlap that may occur in some embodiments. Further only a region 134 of the material thickness edge 130, that is, its impact zone 168 is covered by the clad material 118. The region 134 extends perpendicular or within 15 degrees of perpendicular between the two sides 146, 148. Also depicted is the uncladded region 162 of the material thickness edge 130. The uncladded region 162 is free of the clad material 118. Further, here the clad material 118 although not depicted in these illustrations, may overlap sides 146, 148 at an intersection of the sides with the material thickness edge 130.

The chopper 135 has a predetermined axis of rotation 144, determined in this case by a mounting aperture. The body 114 of chopper 135 has opposed first 146 and second 148 sides with a blunt edge 120 extending transversely between the first 146 and second 148 sides. The body 114 during rotation has a leading face 150 and a trailing face 152 following the leading face 150. The sides 146, 148 extend rearwardly from the leading face 150 to the trailing face 152. The clad material 118 and the blunt edge 120 form at least part of the leading face 150. A radially outward face 156 is defined extending between the first 146 and second 148 sides. The radially outward face 156 faces away from the predetermined axis of rotation 144. The clad material 118 and the blunt edge 120 form at least part of the radially outward face 156. Further, the clad material 118 and the blunt edge 120 form at least part of the leading face 150 and the trailing face 152. The clad material 118 entirely covers a cladded region 134 of the material thickness edge 130. The cladded region 134 extends a full width 122 between the sides. That is, with the chopper 135 embodiment the entire radially outward face 156 is covered by the clad material 118. Again, as with each of the embodiments envisioned of the present invention, the clad material 118 comprises less than 15 percent by weight of the machine part 110, in other embodiments the clad material 118, may comprise less than 10 percent by weight of the part, or in yet other embodiments the clad material 118 may comprise less than 5 percent by weight of the machine part 110. Furthermore, greater than 95 percent of a surface area of the body 114 may be exposed and not covered by the clad material 118.

Turning now to FIGS. 16 and 17, yet another embodiment of the present invention is illustrated, for which previously mentioned parameters can also apply. Here the machine part 110 is illustrated as an auger flight 138 of a combine rotor assembly 174. The body 114 of the machine part 110 is comprised of a base material 116 of a first hardness. The clad material 118 is deposited on the base material 116 and forms at least one blunt edge 120 along the body 114. Clad material 118 comprises a second hardness greater than the first hardness of the base material 116. The body 114 has a predetermined axis of rotation 144. The body 114 has opposed first 146 and second 148 sides with the blunt edge 120 extending transversely between the first 146 and the second sides 148. The body 114 during rotation has a leading face 150 and a trailing face 152 following the leading face 150. The sides 146, 148 extend rearwardly from the leading face 150 to the trailing face 152. A radially outward face 156 is defined extending between the first 146 and the second 148 sides. The radially outward face 156 faces away from the predetermined axis of rotation 144. The clad material 118 and the blunt edge 120 form at least part of the radially outward face 156. Here the entire leading face 150 has received clad material 118. However, as with the other embodiments heretofore discussed the leading face 150 may have only a region that is cladded. Accordingly, the leading face could have an uncladded region as well. As has been discussed with the previous embodiments, here the impact zone 168 that is where the material 112 contacts the auger flight and where the biggest wear occurs is the region that is cladded. Accordingly, an advantage of the present invention is that only the radially outward face 156 receives clad material 118.

Figure 18:
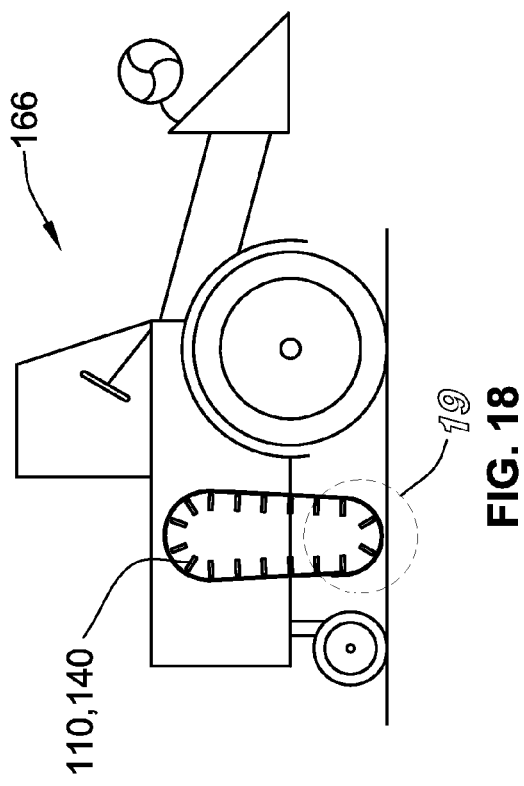
FIG. 18 is a schematic view of an embodiment of the present invention, a cladded grain elevator component in a grain harvester.
Figure 19:
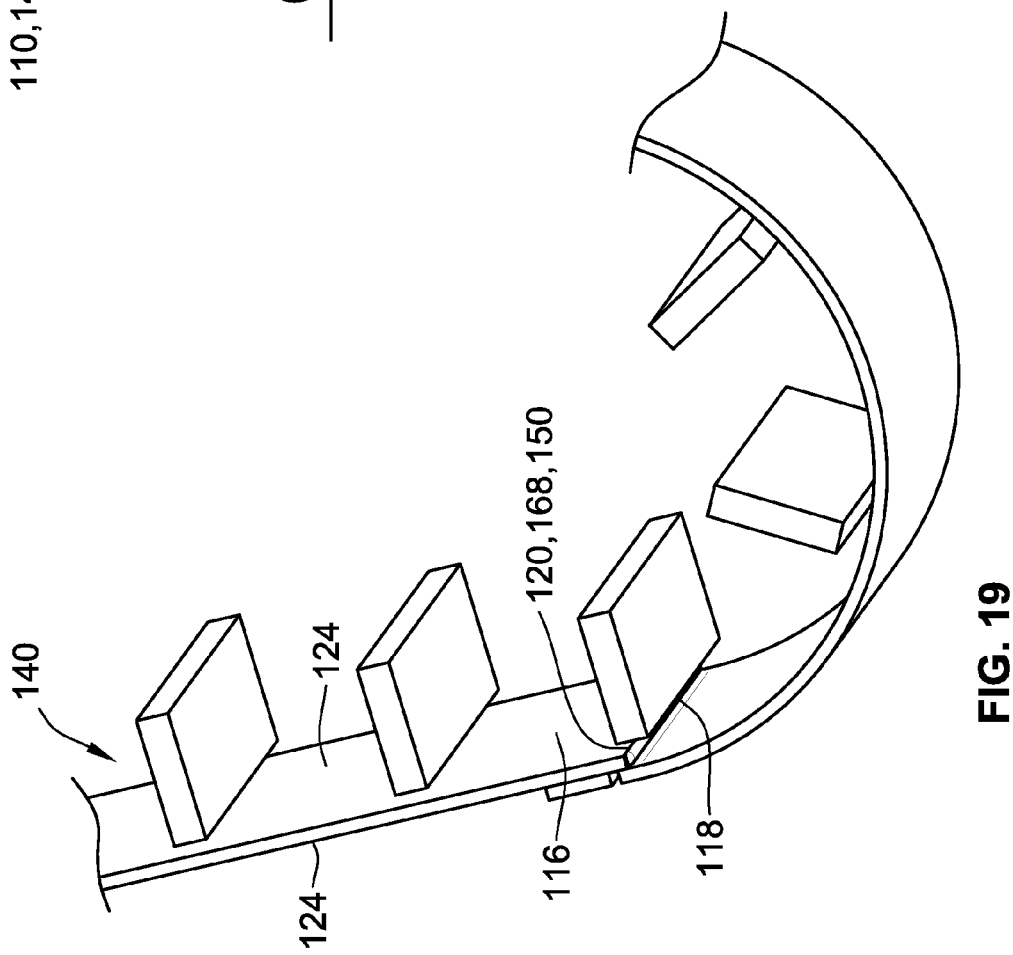
FIG. 19 is an enlarged schematic view of the machine part of FIG. 18.
Figure 20:
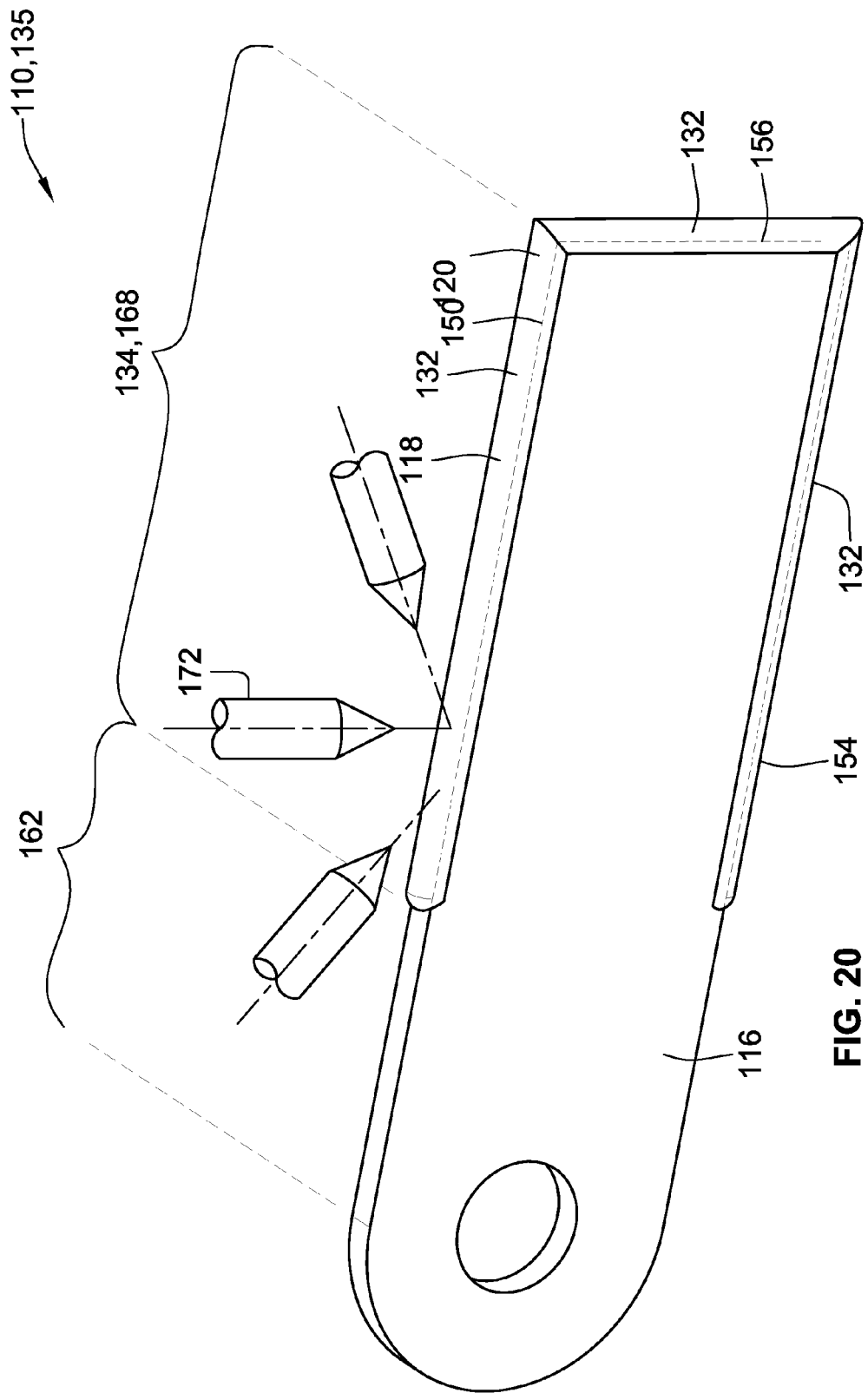
FIG. 20 is an illustration of laser cladding a blunt edge of a machine part of the present invention.

Turning then to FIGS. 18 and 19, yet another embodiment of the present invention is illustrated, for which previously mentioned parameters can apply. Here a machine part 110 is comprised of a body 114 that forms a grain elevator component 140. These grain elevator components 140 are frequently found within grain harvesters 166. The body 114 of the grain elevator component is comprised of a base material 116 of a first hardness. A clad material 118 is deposited on the base material 116. The clad material 118 is of a second hardness greater than the first hardness. The grain elevator component has a material thickness 122 that is defined between two sides 124. A material thickness edge 130 forms a periphery 132 of the body 114 and extends transversely between the two sides. The clad material 118 is deposited on the material thickness edge 130. In this embodiment the material thickness edge 130 is a blunt surface 120. Here, the grain elevator component 140 experiences a flow of material 112 at its impact zone 168 defined by its material thickness edge 130. It is at this material thickness edge 130 that wear occurs. As has been discussed, the advantage of the laser cladding material 118 deposited on the material thickness edge 130, that is, only at the impact zone 168, is the limited amount of material 118 that may be deposited to both prevent wear and prolong the life of the machine part 110,140.

Turning then to FIG. 20, the method of the present invention is illustrated, that is, a laser 172 is shown applying cladding material 118 about the periphery 132 of chopper 135. The cladding as has been discussed is only applied to region 134. Meanwhile region 162 remains uncladded. Here, the cladding is applied to a blunt edge 120 of the chopper 135 and in turn forms a blunt edge with the clad material 118. Because chopper 135 is a rotating agricultural part 142, it has region 134 about the leading edge 150 cladded. Further, the entire outward radial face 156 is cladded while the region 134 about the trailing face 154 is also cladded so as to allow the part to be reversed or rotated in the direction opposite of the first rotation. In this situation, it can be readily appreciated that with this machine part 110, 135, the leading face 150 and trailing face may be reversed depending on the rotation. Accordingly, both faces 150, 152 receive the laser clad material 118. As shown with this and other embodiments it may be advantageous to have the bead overlap the periphery 132 of the body 114 to provide some laser cladding on the face of the sides 146, 148 that abut the blunt edges 120. This slight overlap of cladding material 118 is shown in FIG. 20. Further illustrated is the laser 172 applying the clad to leading face 150 in a normal position, that is close to perpendicular relative to the leading face 150. However, it can be readily appreciated that the angle of attack of the laser clad tool, in this case the laser 172, may be as much as 60 degrees from normal, that is, greater than 30 degrees relative to the face in either direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A machine part for agricultural, turf, mining or construction equipment for processing material, comprising:
a body comprising a base material of a first hardness;
a clad material deposited on the base material and forming at least one blunt edge along the body, the clad material comprising a second hardness greater than the first hardness;
wherein the machine part includes a material thickness defined between two sides, the two sides defining width and length spans that are each at least 5 times or more than the material thickness, wherein a material thickness edge forms a periphery of the body and extends transversely between the two sides, and wherein the clad material is deposited on the material thickness edge; and
wherein the clad material is deposited only upon the material thickness edge and not along either of the two sides.

2. The machine part of claim 1, wherein a region of the material thickness edge is covered by the clad material, the region extending perpendicular or within 15 degrees of perpendicular between the two sides.

3. The machine part of claim 1, wherein the body comprises a sheet steel formed component part having a substantially uniform material thickness.

4. The machine part of claim 3, wherein the clad material comprises at least one of the materials comprising: tungsten carbide, chrome carbide, iron carbide, ceramic, and other material having a Vickers scale hardness between HV 450-3200.

5. The machine part of claim 1, wherein the body forms at least one of a chopper, fan blade, auger flight, grain elevator component, or a rotating agricultural part configured for engaging at least one of grain or stalk material.

6. The machine part of claim 1, wherein the body has a predetermined axis of rotation, with the body having opposed first and second sides with a blunt edge extending transversely between the first and second sides, the body during rotation having a leading face and a trailing face following the leading face, the sides extending rearwardly from the leading face to the trailing face.

7. The machine part of claim 6, wherein the clad material and the blunt edge form at least part of the leading face.

8. The machine part of claim 6, wherein a radially outward face is defined extending between the first and second sides, the radially outward face facing away from the predetermined axis of rotation, wherein the clad material and the blunt edge form at least part of radially outward face.

9. The machine part of claim 6, wherein the clad material and the blunt edge form at least part of the leading face and the trailing face, and wherein a radially outward face is defined extending between the first and second sides, the radially outward face facing away from the predetermined axis of rotation, wherein the clad material and the blunt edge form at least part of the radially outward face.

10. The machine part of claim 1, wherein the clad material comprises less than 15% by weight of the part, and wherein greater than 95% of a surface area of the body is exposed and not covered by the clad material.

11. The machine part of claim 1, wherein the machine part has an impact zone at a leading edge, the impact zone when in use contacting a flow of material prior to other remaining portions of the machine part, and wherein the clad material covers the impact zone and not the remaining portions of the machine part.

12. A stalk or grain harvester, comprising the machine part of claim 1.

13. The stalk or grain harvester of claim 12, wherein the machine part is arranged to engage crop material being run through the grain harvester.

14. A machine part for agricultural, turf, mining or construction equipment for processing material, comiprising:
a body comprising a base material;
a clad material deposited on the base material and forming at least one blunt edge along the body, the clad material comprising a second hardness greater than the first hardness;
wherein the machine part includes a material thickness defined between two sides, the two sides defining width and length spans that are each at least 5 times or more than the material thickness, wherein a material thickness edge forms a periphery of the body and extends transversely between the two sides, and wherein the clad material is deposited on the material thickness edge; and
wherein the clad material comprises at least one laser clad bead or beads deposited upon the material thickness edge having a depth of between 0.5 and 10 millimeters, and wherein a width of the at least one laser clad bead or beads extends between 25 and 120 percent of the material thickness.

15. The machine part of claim 14, wherein the clad material entirely covers a cladded region of the material thickness edge, the cladded region extending a full width between the two sides.

16. The machine part of claim 15, wherein the clad material partially overlaps the sides at an intersection of the sides with the material thickness edge.

17. The machine part of claim 15, the material thickness edge further comprises an uncladded region free of the clad material.

18. A method of cladding the machine part of claim 1, the method comprising:
cladding material onto a surface of the machine part to provide a hardened region with a second hardness greater than the first hardness; and
configuring a blunt face along the clad surface to engage with a flow of agricultural material.

19. The method of claim 18, wherein the machine part comprises a material thickness defined between two sides, the two sides defining width and length spans that each at least 5 times as more than the material thickness, wherein a material thickness edge forms a periphery of the body and extends transversely between the two sides, and further comprising depositing the clad material in a direction normal to or primarily facing the material thickness edge.

20. The method of claim 19, wherein the depositing of the clad material is directed toward the material thickness edge and not directed along either of the two sides.

21. The method of claim 18, wherein cladding comprises laser cladding particles upon the surface.

22. The method of claim 19, further comprising covering a region of the material thickness edge by the clad material, the region extending perpendicular or within 15 degrees of perpendicular between the two sides.

23. The method of claim 18, further comprising configuring the body into at least one of a chopper, fan blade, auger flight, grain elevator component, or a rotating agricultural part configured for engaging at least one of grain or stalk material.

24. The method of claim 18, further comprising configuring the body with a predetermined axis of rotation, with the body having opposed first and second sides with the blunt edge extending transversely between the first and second sides, the body during rotation having a leading face and a trailing face following the leading face, the sides extending rearwardly from the leading face to the trailing face.

25. The method of claim 24, wherein the clad material and the blunt edge form at least part of the leading face.

* * * * *